United States Patent [19]

Cheong et al.

[11] Patent Number: 5,875,326
[45] Date of Patent: Feb. 23, 1999

[54] DATA PROCESSING SYSTEM AND METHOD FOR COMPLETING OUT-OF-ORDER INSTRUCTIONS

[75] Inventors: Hoichi Cheong; Paul Joseph Jordan; Hung Qui Le, all of Austin, Tex.

[73] Assignee: International Business Machines Corporation, Armonk, N.Y.

[21] Appl. No.: 840,919

[22] Filed: Apr. 25, 1997

[51] Int. Cl.$^6$ .................................................... G06F 9/00
[52] U.S. Cl. ............................................................ 395/591
[58] Field of Search .................................... 395/571, 591, 395/250, 595

[56] References Cited

U.S. PATENT DOCUMENTS

| | | | |
|---|---|---|---|
| 5,491,829 | 2/1996 | Kau et al. | 395/800 |
| 5,548,738 | 8/1996 | Song | 395/375 |
| 5,559,976 | 9/1996 | Song | 395/375 |
| 5,590,351 | 12/1996 | Sowadsky et al. | 395/800.23 |
| 5,708,788 | 1/1998 | Katsuno et al. | 395/390 |

*Primary Examiner*—David Y. Eng
*Attorney, Agent, or Firm*—Elizabeth A. Apperley; Winstead Sechrest & Minick P.C.; Anthony V. S. England

[57] ABSTRACT

During operation of a pipelined data processing system, an interruptible instruction table is used to store target identifiers associated with instructions which may result in speculative execution. During operation of the interruptible instruction table, a pointer, referred to as a completing instruction buffer entry pointer, points to a bottom of the interruptible instruction table if that table includes any instruction. An entry at the bottom of the interruptible instruction table is a next instruction to complete. This entry includes a target identifier, referred to as a non-speculative-non-interruptible TID, may be used to release resources held for all prior executed instructions. The data processing system determines the value of the non-speculative-non-interruptible TID to ensure that order determination is preserved and provides a true speculative execution point.

29 Claims, 7 Drawing Sheets

DATA PROCESSING SYSTEM AND METHOD FOR COMPLETING OUT-OF-ORDER INSTRUCTIONS

TECHNICAL FIELD

The present invention relates in general to a pipelined data processor, and in particular, to a pipelined data processor which performs out-of-order execution and speculative execution of instructions.

BACKGROUND INFORMATION

As data processing systems have evolved over time, the need for faster performance has increased. Today, to improve performance, many data processing systems include pipelined processors. A pipelined processor executes multiple instructions in a simultaneous and overlapping manner. By using such a technique, the pipelined processor is able to process a greater number of instructions within a given time, even though there is a slight increase in the execution time of an individual instruction due to the added pipeline control. Typically, a pipelined processor includes six stages for executing an instruction. The six stages include instruction fetching, instruction decoding, data memory addresses generation, processor resident operand fetching, instruction execution, and results writing.

Traditionally, all stages in a pipeline must proceed at a same time. As a result, the time required to move an instruction one step down the pipeline was determined by a slowest pipe stage. Therefore, in such traditional pipeline processors, throughput of the processor is determined and limited by the slowest pipe stage. To compensate for this limitation, current implementations of pipelined processor either used faster pipe stages or allowed functional units to execute independently at their own pace.

However, by allowing the functional units to proceed independently at their own pace, various pipeline hazards are introduced. When hazards are encountered, the offending instructions and following instructions are flushed and refetched. An example of a pipelined processor which utilizes such out of order execution is the PentiumPro™ processor available from Intel Corporation. It should be noted that PentiumPro™ is a trademark of Intel Corporation. The PentiumPro™ microprocessor allows memory read operations to be reordered ahead of some write operations. To perform this reordering operation, a central processing unit of the PentiumPro™ processor reorders read operations around the write operations, but such reordering is not observable from a program point of view. For information regarding the PentiumPro™, refer to "Intel's . . . ," *Byte Magazine*, by Tom R. Halfell, April 1995, pp. 42–58.

Additionally, the PowerPC™ 604 RISC microprocessor available from IBM Microelectronics also performs out of order instruction execution. While dispatching an instruction, dispatch logic within the PowerPC™ 604 allocates instruction to an appropriate execution unit. It should be noted that PowerPC is a trademark of IBM Corporation. A reorder entry in a special completion buffer is allocated for each instruction and dependency checking is performed between the instructions in a dispatch queue. Executed instructions are retired in the completion unit. In addition to storing the dispatched instructions, the completion unit updates register files and control registers in an appropriate manner. Furthermore, the completion unit guarantees sequential programming and only retires an instruction from the completion buffer when all instructions ahead of it have been completed and the instruction itself has finished execution. Thus, the completion unit, together with the reorder or completion buffer, ensure that instructions that execute in an out-of-order manner are retired in the same order as they were originally provided. While both the PowerPC™ 604 and PentiumPro™ microprocessor solutions provide significant advantages over more traditional pipelining implementations, the use of the completion buffer in the PowerPC™ 604 and a reorder buffer in the Intel PentiumPro™ require a specific table or memory storage location to keep track of an original program order and require results to be completed in order. Such strict ordering is required to ensure that instructions which access the same resource of a data processor are correctly executed in an original ordering so that a correct result is obtained. Thus, these implementations require the use of an extra table for performing such reordering operations and are limited to completing instructions in order, as well. The use of the extra table requires additional circuit area overhead and, therefore, increases the costs associated with the data processor.

In addition to using the completion buffer to track an original program order, completion buffers typically have a completion pointer which indicates which resources should be released when an instruction is complete. As has been previously discussed, a dispatched instruction may not execute for a significant amount of time. In the interim, instructions which are found later in the program sequence may be executed. Since the completion buffer tracks all instructions which have been dispatched and since instructions are executed out-of-order, the completion buffer may have to store many instructions. The design of such a large completion buffer to meet cycle time and area requirements is difficult, at best.

Therefore, a need exists for a mechanism which reduces the complexity associated with large completion buffers so that there is greater flexibility and better use of resources within a data processing system.

SUMMARY OF THE INVENTION

The previously mentioned needs are fulfilled with the present invention. Accordingly, there is provided, in a first form, data processing system. The data processing system includes a target identification circuit for generating a plurality of target identification values and a memory for selectively storing a first portion of the plurality of target identification values. Each of the plurality of target identification values corresponds to an instruction. The data processing system also includes a completion control circuit for providing a completing instruction pointer which selectively indicates a predetermined storage location in the memory and an empty memory signal when the memory stores none of the plurality of target identification values. A projection circuit is connected to the completion control circuit for receiving the completing instruction pointer. The projection circuit evaluates the completing instruction pointer to generate a projected target identification value and a projected target identification valid value. A select generation circuit is connected to the completion control circuit for receiving the empty memory signal and is connected to the projection circuit for receiving the projected target identification value. The select circuit generates a first select signal. A selector is connected to the select generation circuit to receive the first select signal, connected to the projection circuit to receive the projected target identification value and connected to the target identification circuit to receive a preselected one of the plurality of target identification values. The selector provides one of the preselected one of the plurality of target identification values and the projected target identification value as a non-interruptible target identification value.

Additionally, there is provided, in a second form, a data processing system. The data processing system includes a memory for selectively storing a portion of a plurality of information values corresponding to a portion of a plurality of instructions being executed in the data processing system and a projection circuit for providing a projected information value to indicate a projected one of the plurality of instructions to be executed during a current timing cycle. The data processing system also includes an identification generation circuit for generating a preselected one of the plurality of information values and a selection circuit. The selection circuit selectively provides one of the projected information value and the preselected one of the plurality of information values as a non-interruptible information value which corresponds to a next instruction to be executed in the data processing system. The selection circuit is connected to the projection circuit for receiving the projected information value and is connected to the identification generation circuit for receiving the preselected one of the plurality of information values.

Furthermore, there is provided, in a third form, a method for completing instructions in a data processing system. The method includes the steps of generating a plurality of target identification values and selectively storing a first portion of the plurality of target identification values. Each of the plurality of target identification values corresponds to an instruction. A completing instruction pointer which selectively indicates a predetermined storage location in the memory and an empty memory signal when the memory stores none of the plurality of target identification values are provided. The method also includes the steps of evaluating the completing instruction pointer to generate a projected target identification value and a projected target identification valid value, generating a first select signal in response to the empty memory signal and the projected target identification value, and providing one of the preselected one of the plurality of target identification values and the projected target identification value as a non-interruptible target identification value.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Pipelined superscalar data processors often use a technique of speculative execution to improve performance. If a data processor executes instructions speculatively, then the data processor must have a mechanism to cancel those speculative results. In addition, the microarchitecture of a data processor may require that certain instructions have specific relationships to execution and completion points in the data processor. For these and many other reasons, order determination can be very important in data processors.

In the present invention, each instruction is assigned a unique identifier, referred to as a target identifier. Target identifiers (TID) are assigned in such a manner that program order is ensured between instructions and that program order may be determined through the use of TIDs. It is important to note that TIDs may be divided into two banks, and that an attempted entry into a bank can cause an instruction dispatch to stop. In the present invention, the two banks are indicated by a most significant bit of the identifier stored therein. The first bank is referred to as Bank 0 and the second bank is referred to as Bank 1. The identifier assignment logic provides a global signal that indicates whether Bank 0 or Bank 1 is a youngest bank to a remaining portion of the data processor in which the present invention is implemented. It should be noted that the youngest bank is the bank which has most recently been cleared of all assignments, either through instruction execution or cancellation. Furthermore, the identifier assignment logic inhibits the dispatch of any instruction which will cause a first identifier assignment into a bank of identifiers that has not been completely cleared.

It should be noted that resources which are modified by an instruction will be identified with the first TID assigned to the instruction. Furthermore, each instruction which can cause an exception or initiates a speculative execution path will have a corresponding TID placed in an interruptible instruction table. It should be noted that instructions which allow for speculative execution can involve control flow predictions, such as predicted outcomes for branch operations, or data flow predictions, such as predicted results such as bit flags.

During operation of the interruptible instruction table, a pointer, referred to as a completing instruction buffer entry pointer, points to a bottom of the interruptible instruction table if that table includes any instruction. An entry at the bottom of the interruptible instruction table is a next instruction to complete. It should be noted that all instructions dispatched prior to this next instruction to complete have been completed and resources held for those prior instructions should be released. Therefore, the TID associated with the next instruction to complete may be used to release resources held for all prior instructions. The TID that serves the purpose of releasing resources held for prior instructions is referred to as a "non-speculative-non-interruptible TID (NSNI-TID). The present invention provides a methodology for generating the NSNI-TID.

For instance, because of stringent timing requirements, the TID associated with the bottom entry in the interruptible instruction table cannot be determined early enough in a timing cycle. Therefore, prediction of the bottom entry must be used to form the NSNI-TID. Additionally, it should be noted that sometimes the interruptible instruction table is empty and resources should be released as soon as possible. In this case, the NSNI-TID is more complex than just a TID associated with an instruction at the bottom of the interruptible instruction table.

When the interruptible instruction table is empty, there is no speculative execution being performed by the data processing system of the present invention. Stated another way, since there are no outstanding instructions which can cause interrupts or change an execution path, then any executing instruction must be on a committed path. There is a special TID, referred to as a smart TID, that reflects a completion point of the data processing system in this situation. Because TID order determination depends on TID bank assignment, the smart TID is controlled in the following manner:

1. If instruction dispatch is not interlocked due to the entry into a new TID bank, then the smart TID is the next TID to be assigned; and
2. If the instruction dispatch is interlocked due to entry into a new TID bank, then the smart TID is the last TID that was assigned.

By correctly calculating the NSNI-TID, the present invention ensures that order determination is preserved and provides a true speculative execution point, which is required by most execution units in modem out-of-order pipelined data processing systems. While the foregoing has provided a general description of operation of the present invention, a following description will provide more detailed information regarding the connectivity of the elements of the present invention, as well as a more detailed description of operation of the present invention.

Description of Connectivity

Figure 1:
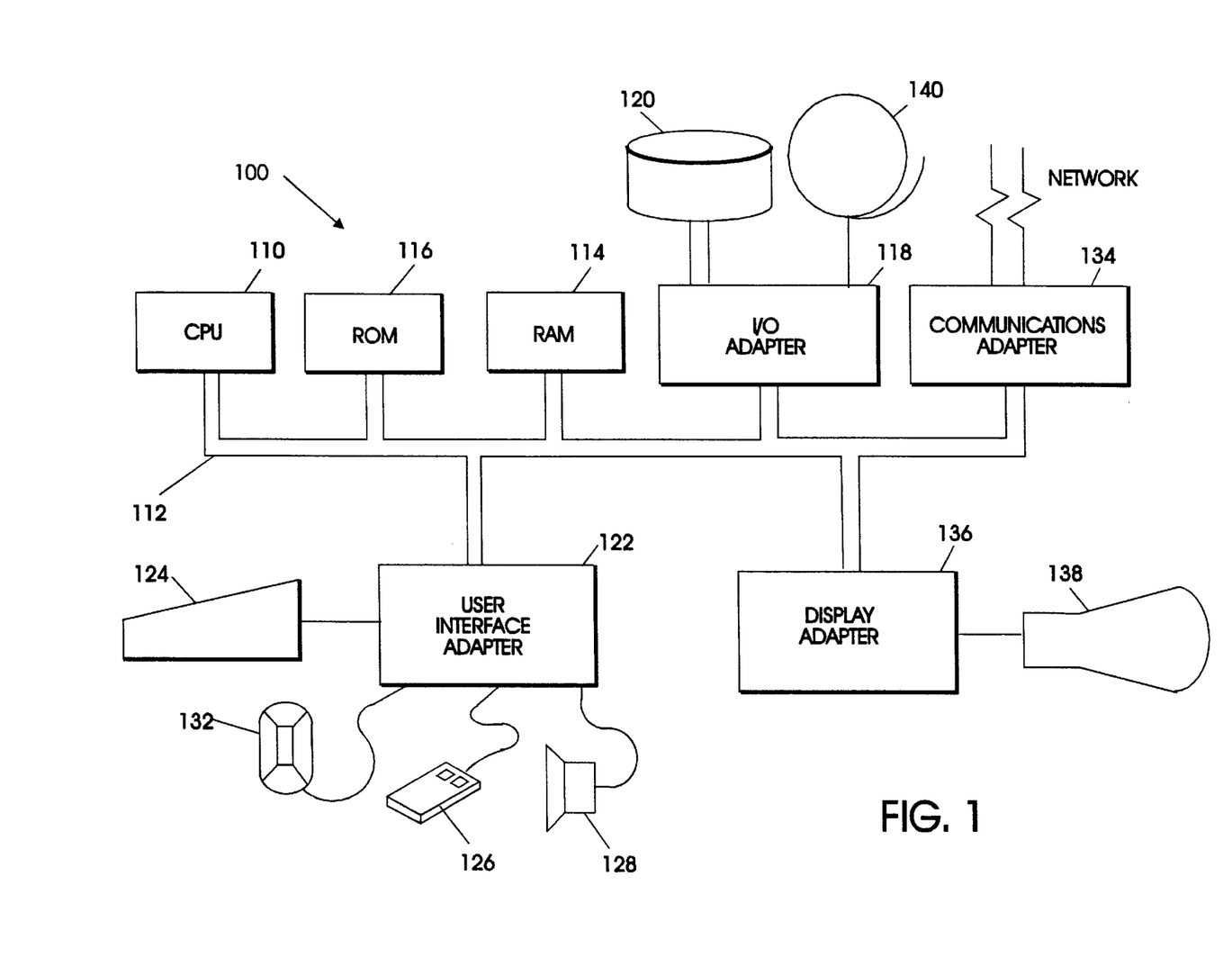
FIG. 1 illustrates, in block diagram form, a data processing system in accordance with one embodiment of the present invention.

One embodiment of the present invention is illustrated in FIG. 1. Referring first to FIG. 1, an example is shown of a data processing system 100 which may be used for the invention. The system has a pipelined central processing unit (CPU) 110. The history buffer of the present invention is included in CPU 110. The pipelined CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 2:
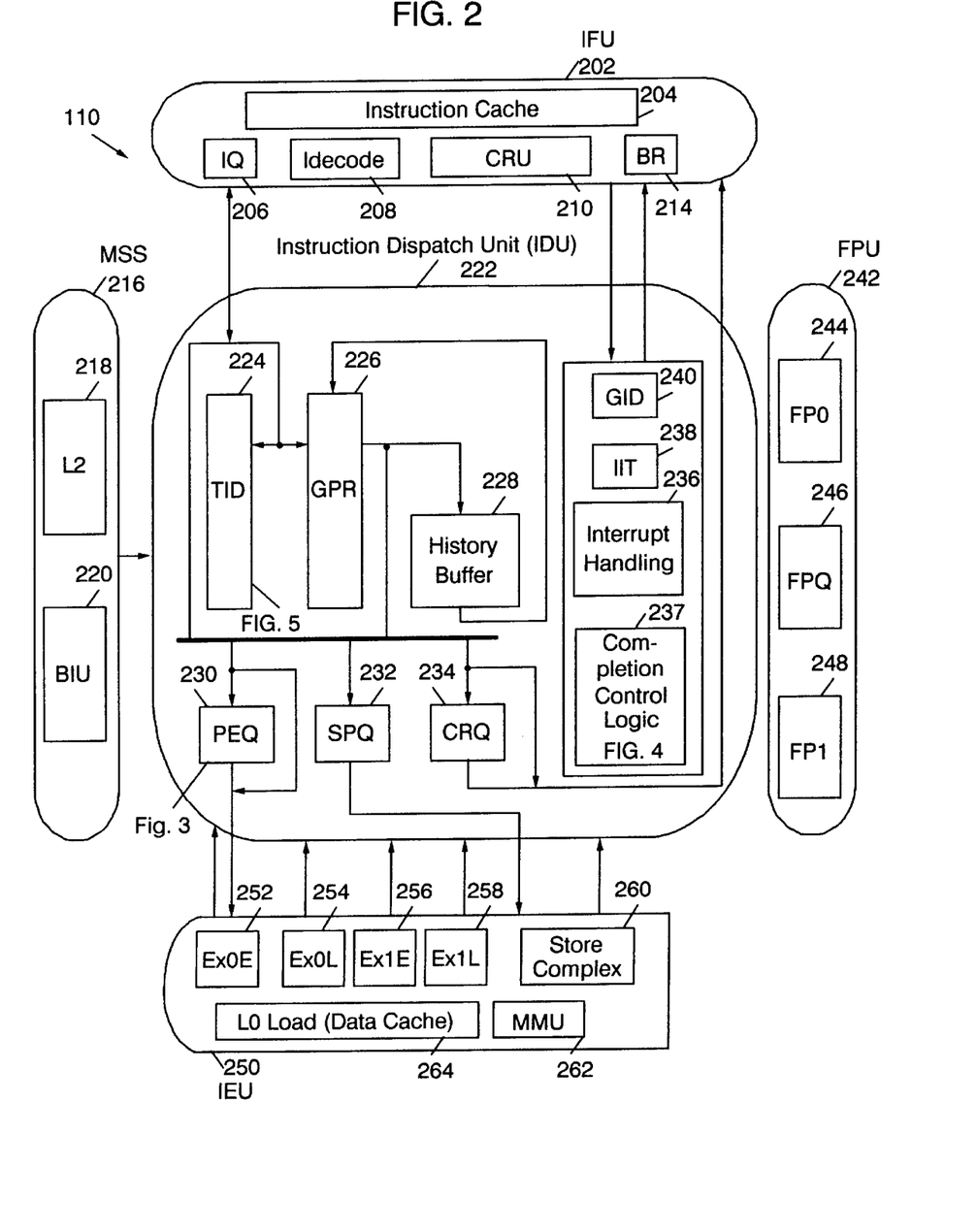
FIG. 2 illustrates, in block diagram form, a pipelined data processor in accordance with one embodiment of the present invention.

One embodiment of the present invention is illustrated in FIG. 2. FIG. 2 provides a block diagram of a pipelined CPU 110 in accordance with one embodiment of the present invention. Pipelined CPU 110 includes an instruction fetch unit (IFU) 202, a memory subsystem (MSS) 216, an instruction dispatch unit (IDU) 222, a floating point unit (FPU) 242, and an instruction execution unit (IEU) 250. IFU 202 comprises an instruction cache 204, an instruction queue (IQ) 206, an instruction decode (Idecode) circuit 208, a condition register unit 210, and a branch (BR) unit 214. Memory subsystem 216 comprises a second level (L2) cache 218, and a bus interface unit (BIU) 220. Floating point unit 242 comprises a floating point unit 0 (FP0) 244, a floating point queue (FPQ) 246, and a floating point unit 1 (FP1) 248. IEU 250 comprises a plurality of fixed-point execution units, Ex0E 252, Ex0L 254, Ex1E 256, and Ex1L 258. Additionally, IEU 250 comprises a store/complex execution unit 260, a L0 load (data cache) unit 264, and a memory management unit (MMU) 262.

IDU 222 comprises a target identification (TID) circuit 224, a plurality of general purpose registers (GPR) 226, a history buffer 228, a pre-execution (PEQ) unit 230, a store/complex pre-execution queue (SPQ) unit 232, and a condition register queue (CRQ) 234. Additionally, IDU 222 comprises an interrupt handling mechanism 236, an interruptible instruction table (IIT) circuit 238, and a group identification (GID) circuit 240. IDU 222 also comprises a completion control logic circuit 237.

Figure 4:
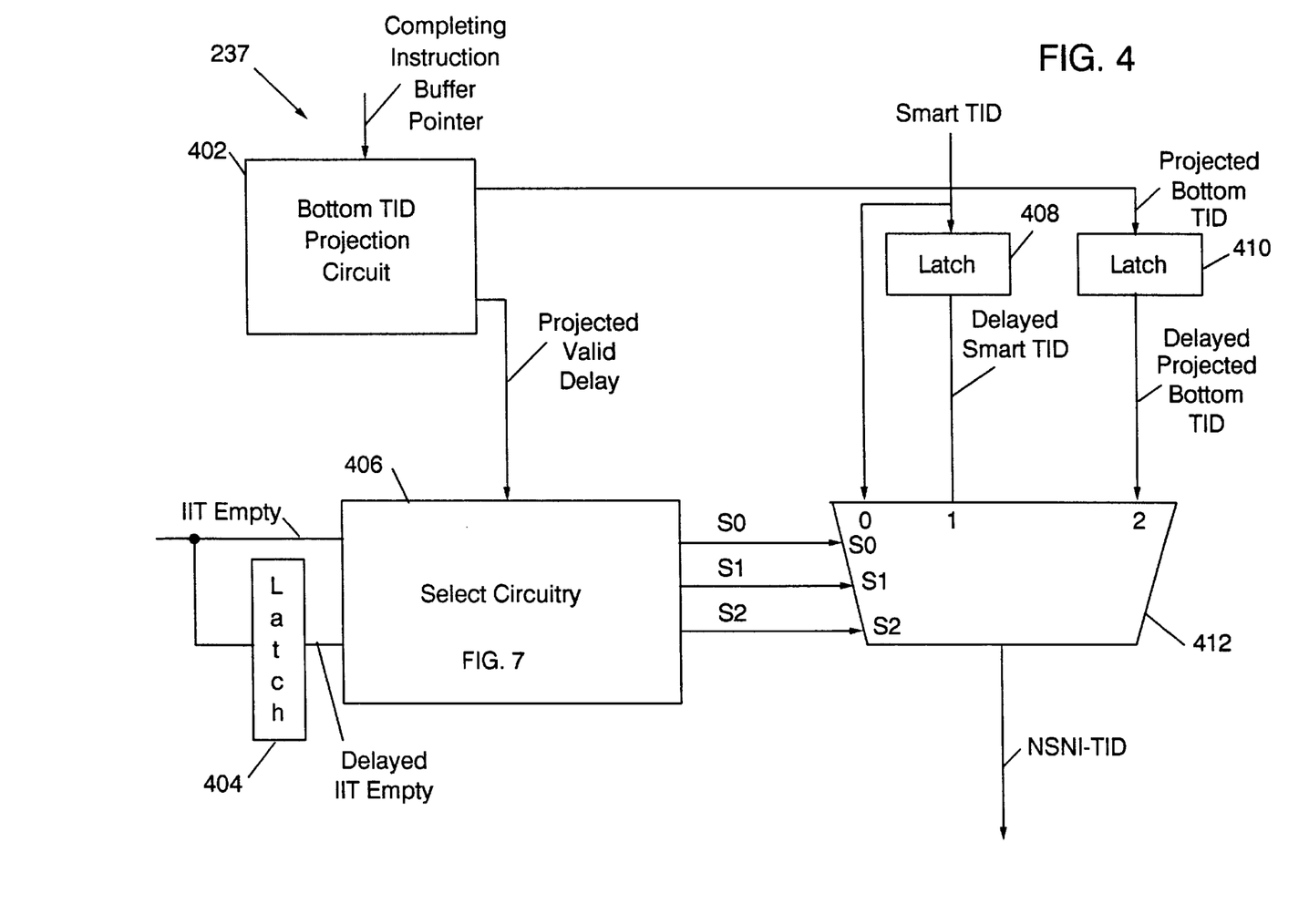
FIG. 4 illustrates, in block diagram form, a portion of a completion control logic circuit in accordance with one embodiment of the present invention.

FIG. 4 illustrates a portion of completion control logic 237 in greater detail. Completion control logic circuit 237 comprises a bottom TID projection circuitry 402, a latch 404, a select circuit 406, a latch 408, a latch 410, and a multiplexer 412. A completing instruction buffer pointer signal is provided to bottom TID projection circuitry 402. Bottom TID projection circuitry 402 is coupled to latch 410 to provide a projected bottom TID signal. Bottom TID projection circuitry 402 is also coupled to select circuit 406 to provide a delayed projected valid signal. A smart TID signal is coupled to latch 408 and a Port 0 input of multiplexer 412. Latch 408 is coupled to multiplexer 412 to provide a delayed smart TID signal. Latch 410 is coupled to multiplexer 412 to provide a delayed projected bottom TID signal. An IIT empty signal is provided to select circuit 406 and latch 404. Latch 404 provides a delayed IIT empty signal to select circuit 406. Select circuit 406 is coupled to multiplexer 412 to provide a plurality of select control signals, S0, S1, and S2. Multiplexer 412 provides an NSNI-TID signal.

Figure 5:
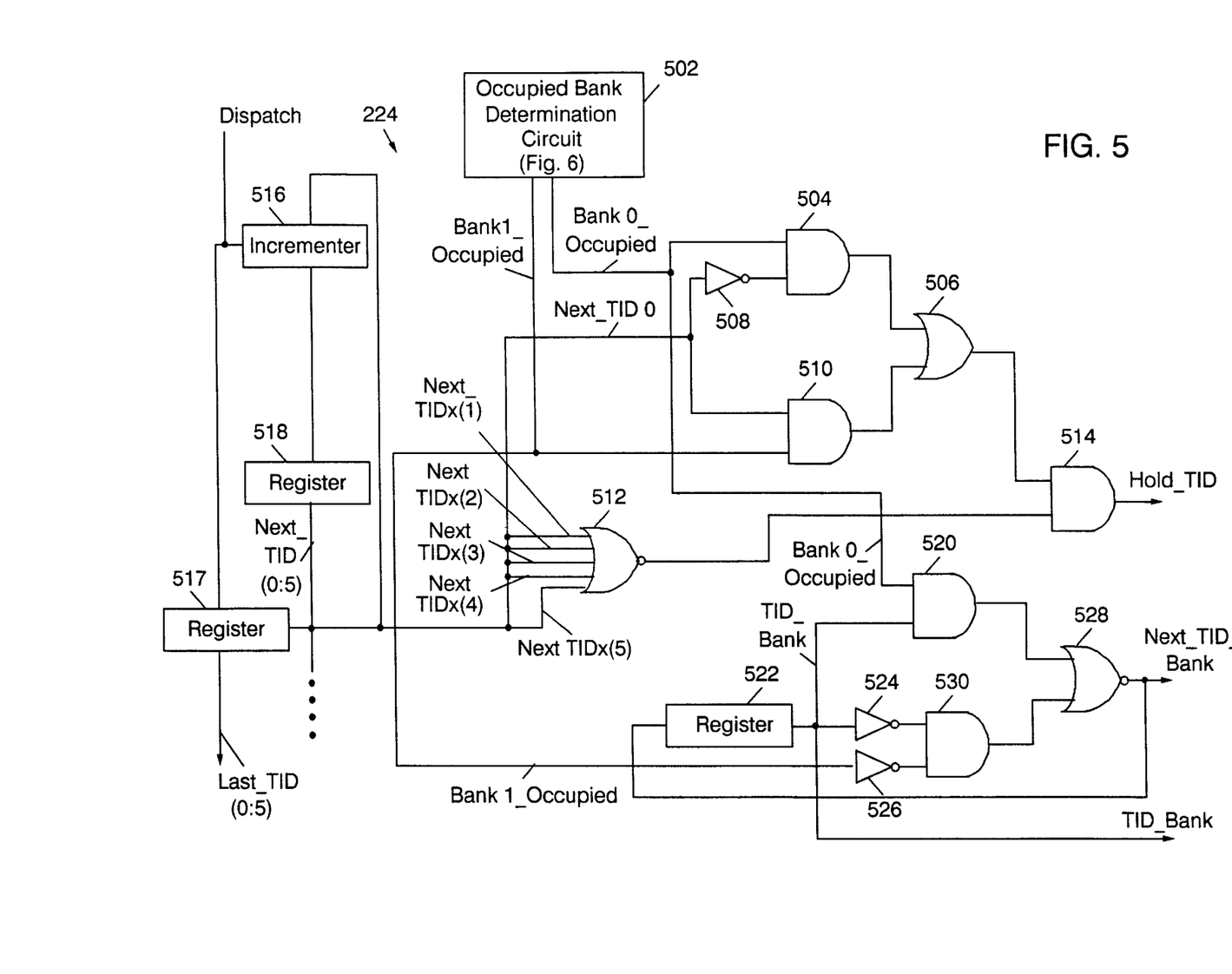
FIG. 5 illustrates, in block diagram form, a portion of a target identification generation circuit in accordance with one embodiment of the present invention.

FIG. 5 illustrates a portion of TID generation circuit 224 of FIG. 2 in greater detail. TID generation circuit 224 comprises an occupied bank determination circuit 502, an AND gate 504, an OR gate 506, an inverter 508, an AND gate 510, a NOR gate 512, an AND gate 514, an incrementer 516, a register 518, an AND gate 520, a register 522, an inverter 524, an inverter 526, an OR gate 528, and an AND gate 530. Occupied bank determination circuit 502 provides a Bank 0 Occupied signal to a first input of AND gate 504. A Next_TID(0) signal is coupled to inverter 508 and a first input of AND gate 510. An output of inverter 508 is coupled to a second input of AND gate 504. Additionally, occupied bank determination circuit 502 is coupled to a second input of AND gate 510 to provide a Bank 1 Occupied signal. An output of AND gate 504 is coupled to a first input of OR gate 506. An output of AND gate 510 is coupled to a second input of OR gate 506. An output of OR gate 506 is coupled to a first input of AND gate 514. A Next_TID(1) bit is provided to a first input of NOR gate 512, a Next_TID(2) bit is provided to a second input of NOR gate 512, and a Next_TID(3) bit is provided to a third input of NOR gate 512, a Next_TID(4) bit is provided to a fourth input of NOR gate 512, and a Next_TID(5) bit is provided to a fifth input of NOR gate 512. It should be noted that the Next_TID(1–5) bits each represent a bit from the same TID value. An output of NOR gate 512 is coupled to a second input of AND gate 514. An output of AND gate 514 provides a Hold_TID signal.

Additionally, the Bank 0 Occupied signal is provided to a first signal of AND gate 520. Similarly, the Bank 1 Occupied signal is provided to an input of inverter 526. An output of inverter 526 is coupled to a first input of AND gate 530. Register 522 is coupled to a second input of AND gate 520 and an input of inverter 524 to provide a TID_Bank signal. An output of AND gate 520 is coupled to a first input of OR gate 528. An output of inverter 524 is coupled to a second input AND gate 530. An output of AND gate 530 is coupled to a second input of OR gate 528. OR gate 528 provides a Next_TID_Bank signal. An output of OR gate 528 is coupled to an input of register 522.

Figure 6:
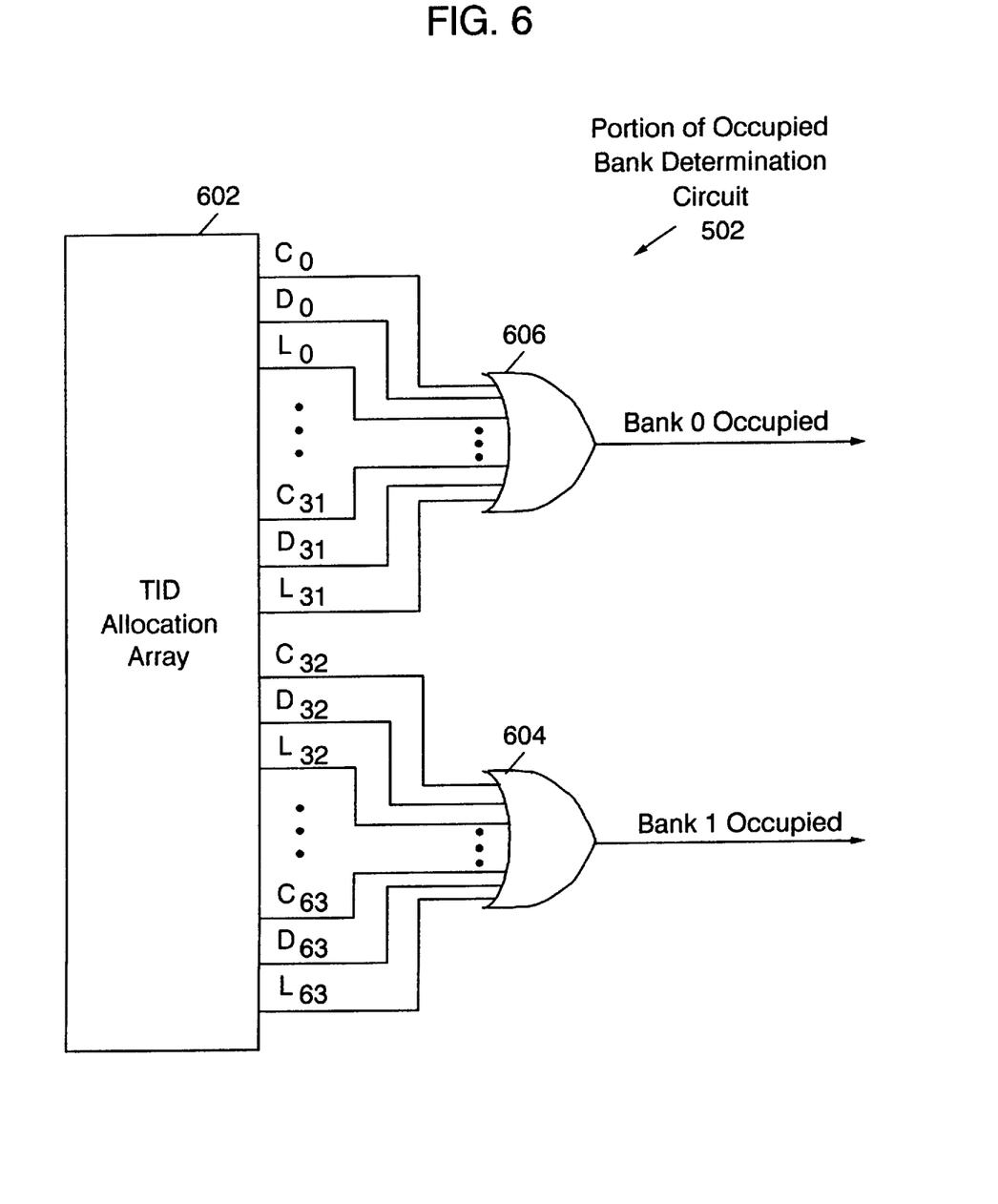
FIG. 6 illustrates, in block diagram form, a portion of an occupied bank determination circuit in accordance with one embodiment of the present invention.

FIG. 6 illustrates a portion of occupied bank determination circuit 502 in greater detail. The portion of occupied bank determination circuit 502 comprises a TID allocation array 602, an OR gate 604, and an OR gate 606. Control signal labeled C, D and L for each of bits 0–31 are provided to an input of OR gate 606. OR gate 606 provides the Bank 0 Occupied signal. Similarly, control signals labeled C, D and L for bits 32–73 are provided as inputs to OR gate 604. An output of OR gate 604 provides the Bank 1 Occupied signal.

Figure 7:
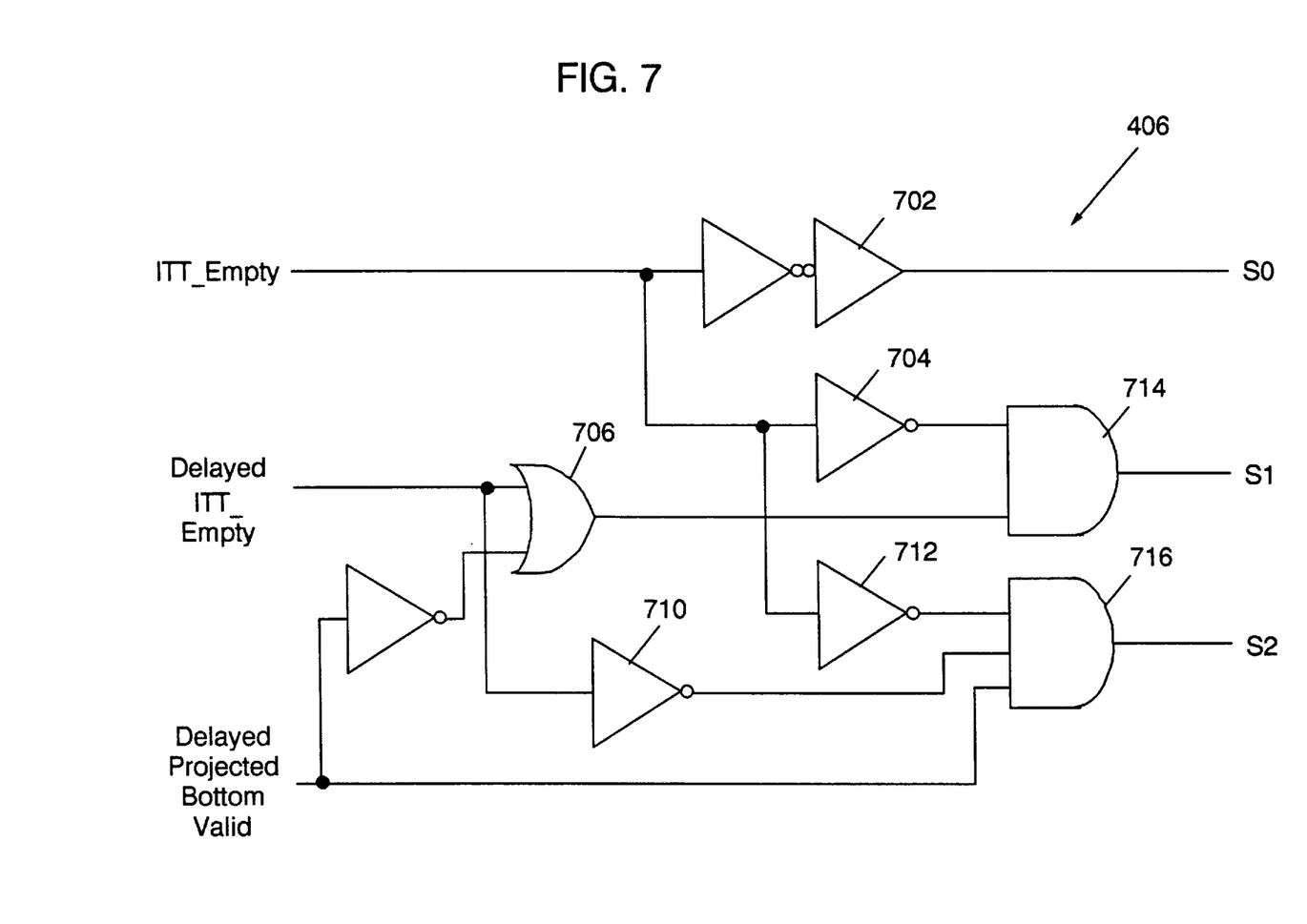
FIG. 7 illustrates, in logic diagram form, a portion of a selected circuit of FIG. 4.

FIG. 7 illustrates a portion of select circuitry 406 of FIG. 4. Select circuitry 406 comprises a non-inverting buffer 702, an inverter 704, an OR gate 706, an inverter 708, an inverter 710, an inverter 712, and an AND gate 716. An IIT empty signal is provided to non-inverting buffer 702 and an input of inverters 704 and 712. An output of non-inverting buffer 702 provides the S0 signal. An output of inverter 704 is coupled to a first input of AND gate 714. An output of inverter 712 is coupled to a first input of AND gate 716. A delayed IIT empty signal is provided to a first input of OR gate 706 and an input of inverter 710. An output of inverter 710 is coupled to a second input of AND gate 716. A delayed projected bottom valid signal is provided to a third input of AND gate 716 and an input of inverter 708. An output of inverter 708 is coupled to a second input of OR gate 706. An output of OR gate 706 is coupled to a second input of AND gate 714. An output of AND gate 714 provides the S1 signal. Furthermore, an output of AND gate 716 provides the S2 signal.

The foregoing discussion provides a description of connectivity of the elements utilized in implementing one embodiment of the present invention. A description of operation of each of these elements will subsequently be provided in greater detail. During the following description of the implementation of the present invention, the terms "assert" and "negate" and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. Additionally, a symbol of "%" before a value indicates that the value is in binary notation.

Description of Operation

FIG. 1 provides a general data processing system which may implement one embodiment of the present invention.

Referring to FIG. 2, instructions for operating pipeline processor 210 are accessed from instruction cache 204 or another instruction source (not illustrated in detail herein). The instructions are stored in instruction queue 206, where they are held until they are decoded by Idecode circuit 208. When a conditional unresolved branch is predicted, these branch instructions are provided to BRQ 214 to be stored for later processing by a branch execution unit (not illustrated in detail herein). After instructions are fetched and decoded, the instructions are provided to IDU 222. Upon receiving instructions, target identifiers (TIDs) are generated by TID generation circuit 224. TIDs are defined for each of the instructions provided to IDU 222 in the same order as the instructions themselves.

It should be noted that in pipelined CPU 110, a finite number of TIDs are available to be assigned to instructions. In one embodiment of the invention described herein, the number of TIDs available is divided into two banks. After a first bank of TIDs has been assigned, IDU 222 begins to assign TIDs from the second bank. When a last TID of the second bank is assigned, the present invention implements a methodology for accessing the first bank of TIDs when all of the TID values stored therein is available for use. It should be noted, however, that when TIDs are still outstanding in a last bank of TID values, a relative age between the last bank of TIDs and the new bank of TIDs must be maintained to ensure correct instruction ordering. In the present invention, a bank bit is utilized to indicate when the Bank 0 of TID values represents older instructions than a Bank 1 of TID values.

The value of the TIDs are assigned by IDU 222. A brief description of each of the elements of IDU 222 will subsequently be provided in greater detail. IDU 222 dispatches instructions from IQ 206. IDU 222 decodes the instructions and forwards them towards an appropriate execution unit, such as Ex0E 252, Ex0L 254, Ex1E 256, or Ex1L 258, and their pre-execution queue designated by PEQ 230. Additionally, IDU 222 assigns TIDs to each instruction and maintains the history of certain registers in history buffer 228 and interruptible instruction table (IIT) 238. TIDs and the history information in history buffer 228 and interruptible instruction table 238 are used to maintain a proper sequential consistency of instruction flow and to help reconstruct a correct system state when an interrupt, mispredicted branch, load and store misordering, or the like, occurs in a pipelined CPU 110.

Interruptible instruction table 228 aids in the reconstruction of a system state by storing TID values corresponding to all interruptible instructions executed by pipelined CPU 110. It should be noted that a TID may be more specifically designated as a unique instruction tag that is used to identify a target architected facility of the instruction. It should be noted that a TID value may be used to resolve operand dependencies or resource allocation dilemmas and to maintain an instruction order. As previously mentioned, during operation, a TID is assigned to all instructions as the instructions are dispatched and decoded, and is released when the instruction is complete and data has arrived at the architected facility.

It should also be noted that IDU 222 schedules the execution of instructions. Pre-execution queue (PEQ 230) is utilized until interlocks, such as operand dependencies or resource allocation dilemmas are resolved and instructions are issued to the appropriate execution unit. IDU 222 comprises three sets of such pre-execution queues. First, a fixed point pre-execution queue (PEQ 230) accepts all load, fixed-point arithmetic instructions. Secondly, a condition register pre-execution queue (CRQ 234) receives instructions involving the alteration of the condition register (included within CRU 210) and compare instructions. Additionally, the store pre-execution queue (SPQ 232) receives all store instructions and complex instructions, such as multiply, divide, and special purpose register accesses.

As each instruction which is executed by pipelined CPU 110 must be assigned a TID, generation of TIDs and the mechanisms for implementing those assignments will subsequently be described in greater detail. To generate a TID value, assume that an initial TID has a binary value of %000000. It should be noted that the TID values which are assigned do not necessarily begin with a value of %000000, but may be initialized at any starting address desired by a designer of pipelined CPU 110. As TIDs are assigned sequentially, a TID assigned a value of 17 will appear to be older than TID assigned values of 19 or 25. In an instance in which all instructions which should have been assigned TIDs in one bank, referred to as Bank 0, instructions are dispatched with TIDs from another bank, referred to as Bank 1. When a TID having the last number in the Bank 1 is assigned, and, therefore, there are no additional TIDs to be assigned from the Bank 1, pipelined CPU 110 must reuse the TIDs assigned in the Bank 0. A mechanism is implemented for designating that TIDs assigned from the Bank 1 are now "older" than TIDs assigned from the newly released Bank 0.

Figure 3:
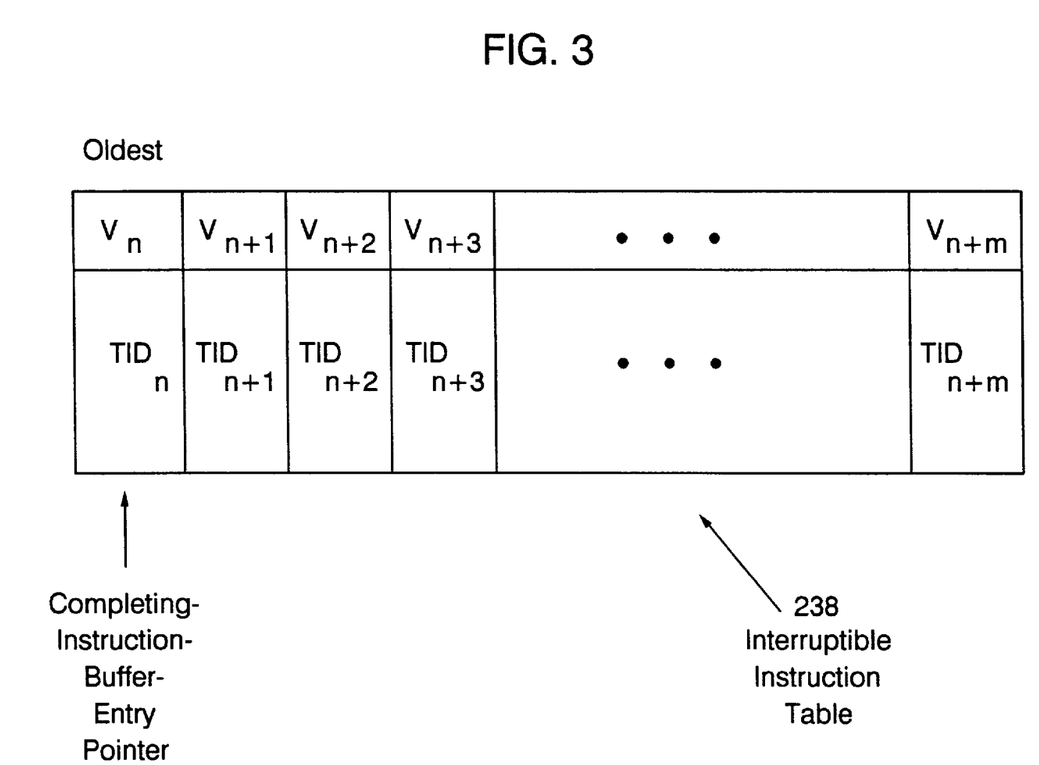
FIG. 3 illustrates, in block diagram form, a portion of an interruptible instruction table in accordance with one embodiment of the present invention.

As TIDs have been explained, a method by which they are utilized in the present invention will subsequently be described. Refer now to FIG. 3 which illustrates the interruptible instruction table in greater detail. It should be noted that interruptible instruction table 238 is a first in/first out (FIFO) queue which aides in the ordering of instructions. Each entry within interruptible instruction table 238 comprises a TID value corresponding to the instruction which may be interrupted and a valid bit corresponding to the entry. The valid bit indicates whether the entry is, indeed, valid and may be used for performing interrupt and flushing operations. Furthermore, it should be noted that interruptible instruction table 238 also comprises a completing instruction buffer entry pointer. As previously mentioned, the completing instruction buffer entry pointer points to a bottom of the interruptible instruction table if the interruptible instruction table includes any instruction. Furthermore, the entry at the bottom of the interruptible instruction table indicates the next instruction to complete. It should be noted that all instructions dispatched prior to this next instruction to complete have been completed and resources held for them should be released. Thus, in some situations, because the completing instruction buffer entry pointer may be used to indicate a TID which is then subsequently used to release resources held for prior instructions, the NSNI-TID may correspond to the completing instruction buffer entry pointer. However, because the bottom entry of the interruptible instruction table may not always be determined early enough in the timing cycle, the present invention implements a prediction circuit which predicts which entry will become the bottom entry of the interruptible instruction table.

It should also be noted that the determination of the NSNI-TID is also complicated by the fact that sometimes the interruptible instruction table is empty which indicates that there is no speculative execution being performed by pipelined CPU 110. In this situation, resources should be released as soon as possible and, therefore, the NSNI-TID becomes more complex than the TID associated with the completing instruction buffer entry pointer.

When the interruptible instruction table stores no TID values, then there is no speculative execution. In this situation, a special TID, referred to as the smart TID, reflects the completion point of the data processing system. Because TID order determination depends on TID bank assignment, the smart TID is controlled in the manner previously described. In this manner, the smart TID is the next TID to be assigned when a dispatch is not interlocked due to the entry into a new TID bank. Additionally, the smart TID is a last TID that was assigned when the dispatch is interlocked due to the entry into a new TID bank. The assignment of TIDs will be described in greater detail with reference to FIGS. 5 and 6.

FIG. 4 illustrates a portion of completion control logic 237 which generates the NSNI-TID. The smart TID and the smart TID value for a previous cycle are both provided to multiplexer 412 of FIG. 4. Additionally, the completing instruction buffer pointer is provided to bottom TID projection circuitry 402. Bottom TID projection circuitry 402 generates a projected bottom TID value by determining a number of consecutive instructions beginning from a bottom entry of the interruptible instruction table which complete in a given time cycle. It should be noted that this number is known late in the given time cycle. The number may then be used to select a TID associated with an entry within interruptible instruction table 238 which is the next to complete. For example, if the bottom entry in IIT 238 is #5, and three interruptible instructions complete, then the TID of entry #8 (5+3) should be the Projected Bottom TID value. The selected TID is latched at the end of a timing cycle to generate a delayed projected bottom TID signal for the next timing cycle. The projected bottom TID is provided to latch 410. Additionally, a valid bit corresponding to the delayed projected bottom TID signal is provided to select circuitry 406 as a projected bottom valid delay signal. This valid bit indicates whether the projected bottom TID value generated by bottom TID projected circuitry 402 is associated with an occupied entry within interruptible instruction table (IIT) 238. If not, the projected bottom TID value is not valid and may not be used to determine the NSNI-TID value. However, the actual logic will subsequently be described.

Additionally, a IIT empty signal is provided to select circuitry 406 from circuitry (not illustrated in detail herein) within completion control logic 237. The IIT empty signal indicates when interruptible instruction table 238 has no valid entries associated with interruptible instructions. Additionally, the IIT empty signal is latched within 404 for one timing cycle. An output of latch 404 provides a delayed IIT empty signal to select circuitry 406. Select circuitry 406 utilizes the IIT empty, IIT empty delay, and projected bottom valid delay values to generate the selected signals, respectively referred to as S0, S1, and S2. The S0 signal a corresponds to the IIT empty signal. Therefore, when the IIT empty signal is asserted, the S0 signal is asserted, and when the IIT empty signal is negated, the S0 signal is negated. The S1 select signal provided by select circuitry 406 is generated by a logical combination of the IIT empty signal, the IIT empty delay signal, and the projected bottom valid delay signal. The logical relationship required to generate the S1 signal is as follows:

S1=$\overline{\text{IIT empty}}$ AND (IIT empty delay OR projected bottom valid delay).

In addition to the S0 and S1 signals, select circuitry 406 provides an S2 select signal to select projected bottom TID delay signal as the NSNI_TID value. The S2 signal is generated by the following logical relationship:

S2=$\overline{\text{IIT empty}}$ AND $\overline{\text{IIT empty delay}}$ AND projected bottom valid delay.

Therefore, upon receipt of the projected bottom valid delay signal, the IIT empty signal, and the IIT empty delay signal, select circuitry 406 provides the S0, S1, and S2 signals to respectively select one of the smart TID value, the smart TID delay value, and the projected bottom TID delay value as the NSNI-TID.

The values of the S0, S1, and S2 select signals are determined to provide the correct NSNI-TID in many different situations. In a first situation, assume that the interruptible instruction table is empty and, therefore, the S0 signal is asserted. Because interruptible instruction table 238 is empty, a next instruction to be dispatched is committed and the resources held with TIDs dispatched prior to the smart TID should be released. If IIT 238 is empty, there is no speculative execution. As previously mentioned, IIT 238 stores the TIDs of all instructions that may cause speculative execution. If there is no speculative execution, all execution results may be committed. Therefore, pipelined CPU 110 will never have to recover to an earlier state. In this first case, then the NSNI-TID is equal to the smart TID. It should be noted that a value of the smart TID has been previously described and explained in greater detail.

In a second case, assume that interruptible instruction table 238 was empty on a last timing cycle, but is not empty during this timing cycle, and, therefore, the S1 signal is asserted. In this situation, bottom TID project circuitry 402 could not predict what the bottom TID would be in the last timing cycle, because interruptible instruction table 238 was empty. However, because interruptible instruction table 238 is not empty during the present timing cycle, the instruction at the bottom interruptible instruction table 238 which is pointed to by completing instruction buffer entry pointer must have been assigned a TID equal to or subsequent to the smart TID from the last timing cycle. Hence, the NSNI-TID is equal to the smart TID delay value. In this situation, the only interruptible instructions were dispatched during the last timing cycle. The delayed smart TID is the TID of the first instruction dispatched during the last timing cycle. Therefore, it is guaranteed to be older than or the same age as any interruptible instruction.

In a third case, assume that interruptible instruction table 238 was not empty during a last timing cycle and is not empty during the current timing cycle either and the projected bottom TID signal was not valid during the last timing cycle, therefore, the S1 signal is asserted. Because the projected bottom TID was not valid last cycle means that all instructions in interruptible instruction table 238 completed during the last timing cycle. Furthermore, because the interruptible instruction table 238 is not empty, a new instruction must have entered the interruptible instruction table 238 during the last timing cycle. This new instruction must have been assigned a TID equal to or subsequent to the smart TID from the last cycle. Hence, the S1 select signal is asserted and the NSNI-TID is the smart TID delay value.

It should be noted that the bottom entry is an entry after a last instruction to complete, as determined by counting a number of instructions that complete in a given cycle and then counting down that number of instructions from the completion buffer pointer. If there are more instructions to be completed in interruptible instruction table 238, in addition to the last instruction to complete, then the additional instructions would be in buffer entries following the entry for the last instruction to complete, (i.e. starting at the "bottom" entry), and would have a valid status. But if no additional instructions were to be completed in interruptible instruction table 238, then the status of these instructions would be invalid.

Next, in a fourth case when the S2 signal is asserted, assume that the projected bottom valid delay signal is asserted to indicate that all instructions in interruptible instruction table 238 were not completed during the last timing cycle. This implies that IIT 238 was not empty during a last timing cycle and is not empty this timing cycle. In this case, the projected bottom TID calculated during a last timing cycle will become the TID on the bottom of the interruptible instruction table 238 during the current cycle. Hence, the S2 select signal is asserted and the NSNI-TID signal is the projected bottom TID delay value.

A logic implementation for illustrating one embodiment of the select circuitry 406 which generates the S0, S1, and S2 signals is illustrated in FIG. 7.

FIG. 5 illustrates TID generation circuit 224 in greater detail. During operation, an initial TID is stored in register 518. Register 518 provides this TID as the Next_TID (0:5) signal to a remaining portion of IDU 222, as well as logic circuitry internal to TID generation circuit 224. The use of this Next_TID (0:5) value will subsequently be discussed in greater detail. Prior to that discussion, however, the use of the Next_TID (0:5) value within TID generation circuit 224 will be discussed. As previously mentioned, TID generation circuit 224 generates a bank bit which indicates when TIDs assigned from Bank 0 are older or younger than TIDs assigned from Bank 1. In FIG. 5, the bank bit is labeled TID_Bank. To generate the TID_Bank signal, occupied bank determination circuit 502 provides a Bank 0 Occupied signal to AND gate 520. Similarly, occupied bank determination circuit 502 provides a Bank 1 Occupied signal to inverter 526. The Bank 1 Occupied signal is inverted and provided to AND gate 530. Additionally, register 522 stores a TID_Bank value which indicates when TIDs assigned from Bank 0 are older or younger than TIDs assigned from Bank 1. It should be noted that Next_TID_Bank differs from TID_Bank as it represents a future value of the bank bit. The Bank 0 Occupied signal indicates when all TIDs within Bank 0 have been released and are no longer being used during instruction execution. Similarly, the Bank 1 Occupied signal indicates when all TIDs within Bank 1 have been released. By logically combining the TID_Bank signal, the Bank 0 Occupied signal, and the Bank 1 Occupied signal, the Next_TID_Bank signal is generated.

In addition to generating a Next_TID_Bank signal and a TID_Bank signal, TID generation circuit 224 generates a HOLD_TID signal. The HOLD_TID signal is generated by providing the lower five bits of the Next_TID value of NOR gate 512. By utilizing this configuration, when the lower five bits of the Next_TID value have a logic 0 value, an output of NOR gate 512 is a logic 1 value. A lower five bits of a TID value have a logic 0 value when a next TID that is accessed is a number 0 or a number 32 to indicate that either the Bank 0 or the Bank 1, respectively, has been accessed. Additionally, pipelined CPU 110 must determine that the bank which is to be entered and from which TIDs are to be assigned is clear and all TIDs and instructions associated therewith have been retired before that bank may be utilized. Occupied bank determination circuit 502 generates signals for determining when Bank 0 and Bank 1 are occupied. Next_TID(0) is inverted and logically AND'ed with Bank 0 Occupied signal to indicate whether Bank 0 may be accessed during a subsequent TID assignment operation. Similarly, the Next_TID(0) value is logically AND'ed with a Bank 1 Occupied signal to determine whether TIDs may be assigned from Bank 1. Therefore, if an appropriate one of Bank 0 or Bank 1 is not occupied, and TIDs are to be assigned from a new bank, the HOLD_TID signal is modified in accordance with the logical function performed by AND gate 514.

Occupied bank determination circuit 502 is illustrated in greater detail in FIG. 6. Occupied bank determination circuit 502 comprises a TID allocation array which stores a plurality of control bits corresponding to each TID assigned during operation of pipelined CPU 110. Each TID entry in TID allocation array 602 comprises a data (D) bit, a complete (C) bit, and a CR logic (L) bit. Each of the D, C, and L bits are set at assignment depending on an instruction which is to be executed. The D bit indicates whether or not a result is available from the instruction. When a result is provided on a result bus from the execution units within pipelined CPU 110, the bit is reset or negated. Conversely, if the instruction will never provide a result on a result bus broadcast to other components within pipelined CPU 110, the D bit is not asserted. Furthermore, the C bit indicates whether an instruction has completed. Because a TID cannot be reused until an instruction has been completed, this bit must be analyzed to determine whether a TID bank may be released for subsequent use. Therefore, if an instruction is interruptible, the C bit is be asserted. Conversely, if the instruction to which the TID is not interruptible, the C bit is negated. Furthermore, the L bit is used to indicate whether the instruction to which the TID is assigned modifies a condition register. If any one of the 3 bits for each of the 32 TIDs stored within a first bank are asserted, OR gate 606 asserts Bank 0 Occupied signal. Similarly, if any of the 3 bits associated with each of 32 TIDs and Bank 1 is asserted, OR gate 604 asserts the Bank 1 Occupied signal.

Each of the Bank 0 Occupied and Bank I Occupied signals is provided to an appropriate logic gate within the portion of TID generation circuit 224 of FIG. 5.

The methodology and data processing system described herein implement an effective method for determining a non-speculative-non-interruptible TID which may be used for releasing resources in a pipelined data processor. It should be well-known however, to those with skill in the relevant art, that the embodiment of the invention described herein is provided as an example. Additional implementations also exist. For example, the logic circuit used to implement completion control logic circuit 237, and especially select circuitry 406 may be implemented using multiple techniques which perform the same function. Additionally, logic used to implement each of the circuits of the present invention may be logic true or logic false, depending on a designer of pipelined CPU 110.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A data processing system, comprising:

a target identification circuit for generating a plurality of target identification values;

a memory for selectively storing a first portion of the plurality of target identification values, wherein each of the plurality of target identification values corresponds to an instruction;

a completion control circuit for providing a completing instruction pointer which selectively indicates a predetermined storage location in the memory and an empty memory signal when the memory stores none of the plurality of target identification values;

a projection circuit coupled to the completion control circuit for receiving the completing instruction pointer, the projection circuit evaluating the completing instruction pointer to generate a projected target identification value and a projected target identification valid value;

a select generation circuit coupled to the completion control circuit for receiving the empty memory signal and coupled to the projection circuit for receiving the projected target identification value, the select circuit generating a first select signal; and a selector coupled to the select generation circuit to receive the first select signal, coupled to the projection circuit to receive the projected target identification value and coupled to the target identification circuit to receive a preselected one of the plurality of target identification values, the selector providing one of the preselected one of the plurality of target identification values and the projected target identification value as a non-interruptible target identification value.

2. The data processing system of claim 1 wherein the instruction is interruptible.

3. The data processing system of claim 1 wherein the memory is a first-in, first-out queue.

4. The data processing system of claim 1 wherein the non-interruptible target identification value indicates a next instruction to be completed by the data processing system.

5. The data processing system of claim 4 wherein a plurality of instructions executed prior to the next instruction have been completed.

6. The data processing system of claim 5 wherein a plurality of resources utilized by the plurality of instructions are released when the next instruction is completed.

7. The data processing system of claim 1 wherein the preselected one of the plurality of target identification values indicates one of a next target identifier to be assigned by the target identification generation circuit and a last target identifier to be assigned by the target identification generation circuit.

8. The data processing system of claim 1 wherein the select generation circuitry selectively logically combines the projected target identification value and the empty memory signal to generate the first select signal.

9. The data processing system of claim 1, further comprising:
a latch for receiving the empty memory signal, for storing the empty memory signal for a predetermined time period, and for providing a delayed empty memory signal.

10. The data processing system of claim 9 wherein the select generation circuit logically combines the projected target identification valid value, the empty memory signal, and the delayed empty memory signal to generate the first select signal, a second select signal, and a third select signal.

11. The data processing system of claim 10 wherein the first select signal selects the preselected one of the plurality of target identification values as the non-interruptible target identification value when the first select signal is in a first logic state, the second select signal selects a delayed preselected one of the plurality of target identification values as the non-interruptible target identification value when the second select signal is in a second logic state, and the third select signal selects a delayed projected target identification value as the non-interruptible target identification value when the third select signal is in a third logic state.

12. A data processing system, comprising:
a memory for selectively storing a portion of a plurality of information values corresponding to a portion of a plurality of instructions being executed in the data processing system;
a projection circuit for providing a projected information value to indicate a projected one of the plurality of instructions to be executed during a next timing cycle;
an identification generation circuit for generating a preselected one of the plurality of information values; and
a selection circuit for selectively providing one of the projected information value and the preselected one of the plurality of information values as a non-interruptible information value which corresponds to a next instruction to be completed in the data processing system, the selection circuit being coupled to the projection circuit for receiving the projected information value and being coupled to the identification generation circuit for receiving the preselected one of the plurality of information values.

13. The data processing system of claim 12, further comprising:
a completion control circuit for providing a completing instruction pointer which selectively indicates a predetermined storage location in the memory and an empty memory signal which indicates the memory stores none of the portion of the plurality of information values.

14. The data processing system of claim 13 wherein the selection circuit, further comprises:
a select generation circuit coupled to the completion control circuit for receiving the empty memory signal and coupled to the projection circuit for receiving a projected information valid value, the select circuit generating a first select signal; and
a selector coupled to the select generation circuit for receiving the first select signal, coupled to the projection circuit for receiving the projected information value, and coupled to the identification generation circuit to receive the preselected one of the plurality of information values, the selector providing one of the projected information value and the preselected one of the plurality of information values as the non-interruptible information value.

15. The data processing system of claim 12 wherein the portion of the plurality of instructions is interruptible instructions.

16. The data processing system of claim 12 wherein the memory is a first-in, first-out queue.

17. The data processing system of claim 12 wherein a portion of the plurality of instructions executed prior to the next instruction have been completed.

18. The data processing system of claim 17 wherein a plurality of resources utilized by the portion of the plurality of instructions are released when the next instruction is completed.

19. A method for completing instructions in a data processing system, comprising:
generating a plurality of target identification values;
selectively storing a first portion of the plurality of target identification values, wherein each of the plurality of target identification values corresponds to an instruction;
providing a completing instruction pointer which selectively indicates a predetermined storage location in the memory and an empty memory signal when the memory stores none of the plurality of target identification values;
evaluating the completing instruction pointer to generate a projected target identification value and a projected target identification valid value;
generating a first select signal in response to the empty memory signal and the projected target identification valid value; and
providing one of the preselected one of the plurality of target identification values and the projected target identification value as a non-interruptible target identification value.

20. The method of claim 19 wherein the instruction is interruptible.

21. The method of claim 19 wherein the memory is a first-in, first-out queue.

22. The method of claim 19 wherein the non-interruptible target identification value indicates a next instruction to be executed by the data processing system.

23. The method of claim 19 wherein the preselected one of the plurality of target identification values indicates one of a next target identifier to be assigned by the target identification generation circuit and a last target identifier to be assigned by the target identification generation circuit.

24. The method of claim 19, further comprising the step of:
selectively logically combining the projected target identification valid value and the empty memory signal to generate the first select signal.

25. The method of claim 19, further comprising the steps of:
receiving the empty memory signal;
storing the empty memory signal in a latch for a predetermined time period; and
providing a delayed empty memory signal.

26. The method of claim 25, further comprising the step of:
logically combining the projected target identification valid value, the empty memory signal, and the delayed empty memory signal to generate the first select signal, a second select signal, and a third select signal.

27. The method of claim 26, fuirther comprising the steps of:

selecting the preselected one of the plurality of target identification values as the non-interruptible target identification value when the first select signal is in a first logic state;

selecting a delayed preselected one of the plurality of target identification values as the non-interruptible target identification value when the second select signal is in a second logic state; and selecting a delayed projected target identification value as the non-interruptible target identification value when the third select signal is in a third logic state.

28. In a data processor, wherein data processing operations are performed in cycles, a method comprising the steps of:

dispatching instructions in a sequence;

storing in a corresponding sequence in entrics of a buffer, for such of the instructions which are interruptible, indicia of the instructions;

maintaining a status for such a buffer entry, indicating whether the associated instruction has completed;

identifying, during a certain cycle, a next instruction to complete, wherein the identtifying is in response to whether the buffer is empty and was empty in a preceeding cycle, and whether a predicted bottom entry of the buffer is valid, so that resources may be released in response to the identified instruction.

29. The method of claim 28, comprising the steps of:

maintinig a pointer, indicating which of the buffer entries is for the most recently completed one of the interuptible instuctions; and predicting the bottom entry in response to the pointer and a count of instructions which complete during the certain cycle.

* * * * *